Feb. 23, 1932.  G. C. CHASE  1,846,583

POWER TRANSMISSION MECHANISM

Filed July 26, 1930

INVENTOR
Geo. C. Chase
C. W. Anderson Jr.
ATTORNEY

BY

Patented Feb. 23, 1932

1,846,583

UNITED STATES PATENT OFFICE

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF DELAWARE

POWER TRANSMISSION MECHANISM

Original application filed August 17, 1927, Serial No. 218,637. Divided and this application filed July 26, 1930. Serial No. 471,064.

The invention relates to power transmission mechanism, and more particularly to connecting means between the driving and the driven elements of a lever train.

An object of the invention is the provision of a flexible link connection, whereby energy imparted by a quick stroke of the driving lever is stored and transmitted more slowly to the driven lever.

Another object is the provision of a simple and economical universal joint connection between two levers lying in different planes.

The invention consists in the novel construction and combination of parts, as set forth in the appended claims.

In the accompanying drawings, illustrating the invention:

Figure 2:
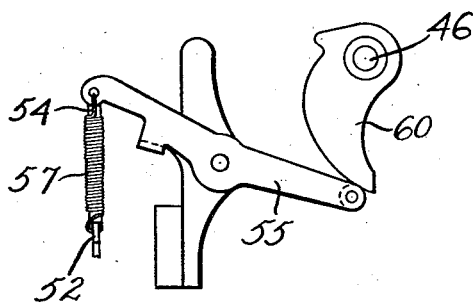
Fig. 2 is an elevation, taken at right angles to Fig. 1, the parts being shown in normal position of rest.
Figure 5:
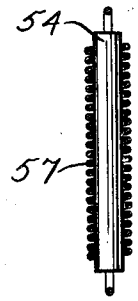
Fig. 5 is an enlarged detail view of the connecting device, with the spring shown in section.
Figure 3:
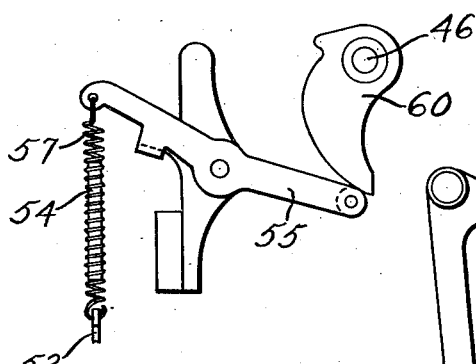
Fig. 3 is a similar view, showing the parts in position assumed during operative movement.
Figure 1:
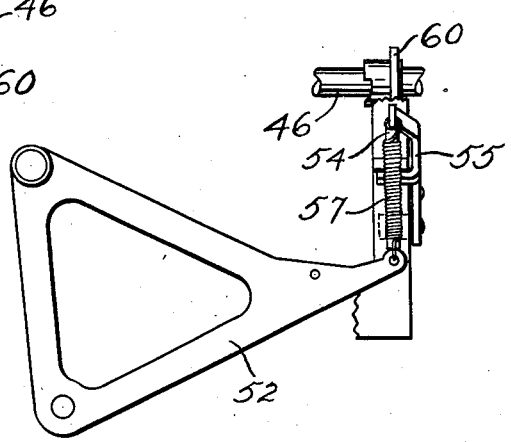
Fig. 1 is a side elevation of the driving lever and connecting device, the driven lever being shown in end elevation.
Figure 4:
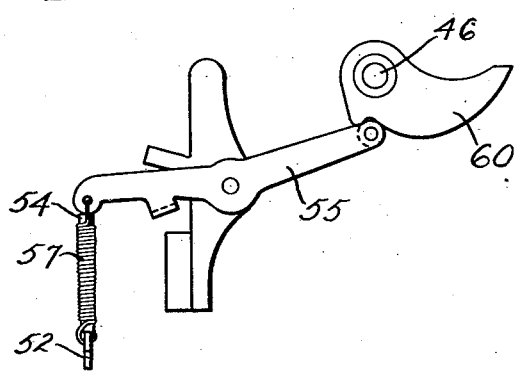
Fig. 4 is a similar view showing the parts in extreme operated position.

These drawings show the invention as applied to the numeral wheel carriage shifting train of a calculating machine, such as the machine disclosed in application Serial Number 213,637, filed August 17, 1927, and entitled "Division stop mechanism for calculators", of which the present application is a division.

In the drawings, the numeral 52 designates a driving lever to which an intermittent reciprocatory impulse is transmitted by means not shown and 55 is a driven lever, operating through cam 60 to rotate shaft 46.

The flexible link connection between levers 52 and 55 is constructed as follows:

Coil spring 57 is secured at one end to lever 52 and at its opposite end to lever 55, and spacer rod 54 is located within the coils of said spring and held thereby with its ends normally in contact with the respective levers. As a result of this arrangement, the attachment points of the spring and the contact points of the spacer lie in a single plane, and the spring tension is uniform, in any position of the levers, which would not be the case were the spring and the spacer rod out of line. Frictional losses are, therefore, considerably reduced in the present arrangement. It is also to be noted that the levers 52 and 55 work in planes at right angles to each other, and that the device disclosed provides the universal joint action necessary to a link connection between such members in a very simple and economical manner. Obviously, the results obtained could be approximated, without departing from the spirit of the present invention, by surrounding spring 57 with a tubular spacer rod.

Spring 57, in the present application of the invention, is designed to yield as the load of the driven parts is encountered, thereby storing energy and utilizing the same more slowly in its operation of lever 55. In case, however, the universal joint action of the connection is desired, without the delayed operation feature, spring 57 may be made of sufficient strength to overcome the lag of lever 55. Obviously, also, the delayed operation feature of the invention may be useful in cases where no universal joint action is involved, as for instance in the case of two levers having a common fulcrum point.

I claim:

1. In power transmission mechanism, a drive train comprising two levers operable in planes lying at angles to each other, and a flexible link connection between said levers, comprising a coiled spring secured at its ends to the one and the other lever, and a spacer rod coaxial with the coils of said spring, normally contacting with both levers, and adapted to hold said spring under tension.

2. In a power transmission mechanism, a plurality of levers, and a flexible link connection between said levers, comprising a tension spring connected to said levers, and a rigid integral spacer member normally contacting with said levers at points lying substantially in line with the spring connections, and adapted to hold said spring under tension.

3. In power transmission mechanism, a plurality of levers, and a flexible link connection between said levers, comprising a coiled spring secured at its ends to said levers and a floating spacer rod coaxial with the coils of said spring, normally contacting with said levers and adapted to hold said spring under tension.

Signed at Orange, in the county of Essex and State of New Jersey, this 22nd day of July, A. D. 1930.

GEORGE C. CHASE.